Dec. 9, 1924.

H. P. KRAFT

PIPE COUPLING

Filed Nov. 10, 1922

1,519,097

INVENTOR:
Henry P. Kraft,
By Attorneys,

Patented Dec. 9, 1924.

1,519,097

UNITED STATES PATENT OFFICE.

HENRY P. KRAFT, OF RIDGEWOOD, NEW JERSEY; EDGAR J. PHILLIPS AND EARL A. DARR EXECUTORS OF SAID HENRY P. KRAFT, DECEASED.

PIPE COUPLING.

Application filed November 10, 1922. Serial No. 600,038.

*To all whom it may concern:*

Be it known that I, HENRY P. KRAFT, a citizen of the United States of America, residing in Ridgewood, in the county of Bergen and State of New Jersey, have invented certain new and useful Improvements in Pipe Couplings, of which the following is a specification.

This invention relates to pipe couplings and aims to provide certain improvements therein. More particularly it relates to a coupling device which can be quickly and easily operated and one which will provide a steam-tight joint between the coupled sections. The device is particularly adapted for use in coupling short lengths of pipe to produce a continuous pipe for conducting vulcanizing fluids in the art of manufacturing pneumatic tire casings. In use, such couplings are subjected to great wear and means are accordingly provided for compensating for this wear on the coupling parts so that a steam-tight joint may be always maintained between the coupled pipe sections. Means are also provided for facilitating the coupling operation and in this respect the present invention constitutes an improvement over that disclosed in my earlier filed application, Serial No. 489,445, filed August 3, 1921. These features of improvement reside in having the lever, which is operable to force the coupling sections together, carried by the coupling, and in providing means for guiding said lever into its operative position. The invention also includes other features of improvement which will be hereinafter more fully described.

In the drawings wherein I have illustrated the preferred embodiments of my invention:

Figure 1:
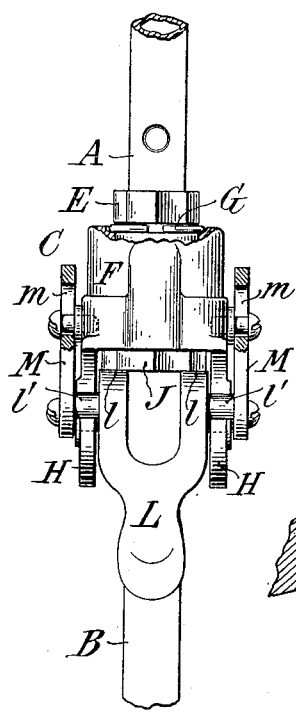
Figure 1 is an elevation of the coupling.

Referring to the drawings let A indicate one length of pipe which it is desired to couple to another length B. These pipes may be suitably connected with a steam line and molds in a manner which need not be here described.

To the adjacent pipe ends are connected in any approved manner such as by being screw-threaded thereon, a pair of coupling sections C and D, the former to the section A and the latter to the section B. The coupling section C, as herein shown, comprises a part E formed with an internal tapered seat *e*, a body portion F swiveled to the part E through the medium of a split ring G, and a pair of ears H depending from the wall of the body portion. The ears are hook-shaped in form and provide suitable fulcrum bearings for a cam lever, as will be hereinafter more fully explained. The swivel connection between the parts E and F permits the latter to be rotated to suit the convenience of the operator and thus facilitate the coupling operation, irrespective of the positions of the branch connections which couple the pipe sections with the tire molds. The coupling section D, as herein shown, comprises a head I connected to the pipe B, said head being formed with an external tapered face *i* adapted to be forced into seating engagement with the tapered seat *e* and an externally threaded portion $i^2$, upon which is adjustably mounted a collar J and a lock nut K, the adjustment of the parts being adapted to compensate for wear on the seating faces as is more fully explained in my earlier filed application hereinbefore referred to. The body portion F is preferably formed with a cylindrical inner wall *f* adapted to coöperate with the collar J to insure a proper seating of the seating faces *e* and *i* preliminary to the final coupling operation.

For the purpose of forcing the tapered seating face *i* against the seat *e* with considerable pressure so that a leak-tight joint will result I provide a forked cam lever L formed at its forked end with cam surfaces *l* and adjacent said end with fulcrums or trunnions *l'* adapted to seat in the hook-shaped bearings on the ears H, which serve as reaction members to receive the thrust of the cam lever when the cam surfaces *l* are urged into engagement with the under side of the sleeve J on the coupling section D. The lever L is preferably forked and its fulcrums or trunnions *l'* formed to extend laterally outward therefrom so as to avoid interference with the pipe B, all of which is best shown in Fig. 1.

Figure 2:
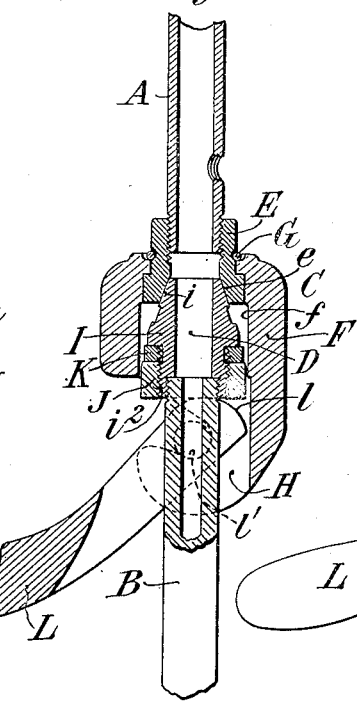
Fig. 2 is a vertical section taken at right angles to Fig. 1.
Figure 3:
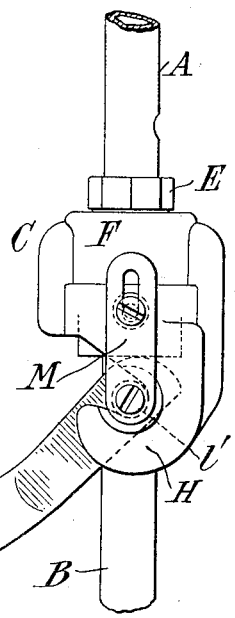
Fig. 3 is an elevation of the coupling viewing it at right angles to Fig. 1.

In order to facilitate the introduction of the pipe B and its coupling section D into the coupling section C, I prefer to have the lever L removable from the ears H, and in order to avoid any possibility of misplacement of said lever I have provided means whereby it may be advantageously carried by the coupling. The means which I have provided also serve to insure the proper positioning of the lever on its pivotal bearings by guiding the lever between the ears and the trunnions $l'$ onto their bearings. These means are shown in Figs. 1 to 3 as a pair of links M each of which is pivotally mounted at one end to one of the trunnions $l'$ and at its other end pivotally and slidably mounted with relation to the body portion F through the medium of an elongated slot in the link engaging over a pin projecting laterally from the body portion. This construction permits of the complete removal of the lever from the ears H, while at the same time retaining a positive connection with the coupling which connection serves to guide and properly position the lever L when it is sought to couple the sections together.

Figure 4:
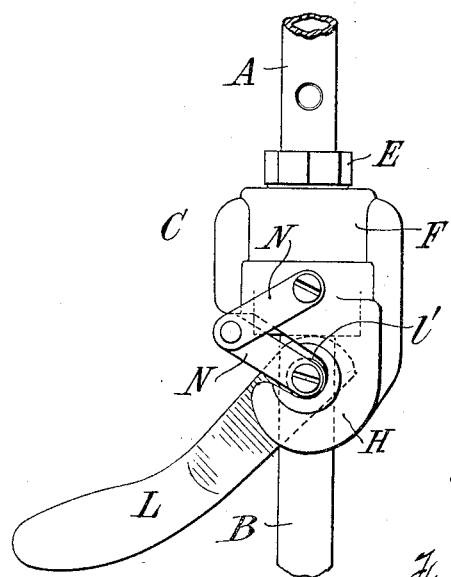
Fig. 4 is a view similar to Fig. 3 of a slight modification.

In Fig. 4 I have shown an alternative construction for the connection between the lever L and the coupling. In said figure instead of slotted links I employ pairs of toggle members N, N. It will be understood, however, that any other suitable means may be employed to accomplish this result.

In use, the coupling sections are first connected to the pipe lengths as described. Then to couple the parts together, the pipe B with its coupling section D is positioned through a relative longitudinal movement with respect to section C so that the tapered seating face $i$ engages the tapered seat $e$. The lever L is then moved downwardly in an arc so that the cam surfaces of the lever engage under the collar J and the trunnions seat on the bearings in the hook-shaped arms, whereupon pressure being brought to bear downwardly upon the lever arm, the cam faces $l$ engage and force the seating faces $e$ and $i$ together. To uncouple the parts a mere reversal of the foregoing operations is necessary.

While I have shown and described the preferred embodiments of my invention it will be understood that I do not wish to be limited thereto, since various changes may be made therein without departing from the spirit of the invention.

What I claim is:

1. A coupling of the type described comprising a part having a seat and a part having a head adapted to enter said seat, a pair of depending ears on the first part between which the head on the second part is adapted to longitudinally pass, said ears being hook-shaped in form to provide pivot bearings for a cam lever carried by the first part, said lever having pins adapted to be mounted on said pivot bearings so as to permit the lever to engage the head on the second part to force it into the seat on the first part and a pair of links pivotally mounted on the first part and connected to the pins on the lever to insure the proper positioning of the lever on the pivot bearings.

2. A coupling of the type described comprising a part having a seat and a part having a head adapted to enter said seat, a pair of depending ears providing a fulcrum for a lever for forcing said head and seat into engagement, the ears being carried by a member swiveled to one of said parts and rotatable about its axis and the lever being pivotally connected to the same member.

In witness whereof I have hereunto signed my name.

HENRY P. KRAFT.